United States Patent [19]

Purvis

[11] Patent Number: 5,769,580
[45] Date of Patent: Jun. 23, 1998

[54] SHIFT STICK DEVICE

[76] Inventor: Leonard P. Purvis, 2645 Lower River Rd., Lithia Springs, Ga. 30057

[21] Appl. No.: 656,828

[22] Filed: Jun. 3, 1996

[51] Int. Cl.$^6$ ..................................................... B60P 7/15
[52] U.S. Cl. .......................................... 410/151; 410/143
[58] Field of Search ........................ 211/105.3; 410/151, 410/143, 145, 121; 248/354.1, 354.5, 354.6; 254/95, 108, 12, 247; 74/167, 141.5, 143; 403/109, 378

[56] References Cited

U.S. PATENT DOCUMENTS

| D. 306,003 | 2/1990 | Berkan, Jr. | D12/155 |
|---|---|---|---|
| 923,463 | 6/1909 | Taylor | 410/151 |
| 3,049,328 | 8/1962 | Bishop | 410/151 X |
| 3,110,506 | 11/1963 | O'Brien | 410/151 |
| 3,995,565 | 12/1976 | Kersey | 410/151 |
| 4,332,515 | 6/1982 | Twyman | 410/149 |
| 4,343,578 | 8/1982 | Barnes | 410/151 |
| 4,375,934 | 3/1983 | Elliott | 254/108 X |
| 4,434,970 | 3/1984 | Boland et al. | 254/108 |
| 4,473,331 | 9/1984 | Wisecarver | 410/143 X |
| 4,669,934 | 6/1987 | Wisecarver | 410/151 |
| 4,781,499 | 11/1988 | Wisecarver | 410/151 |
| 5,082,404 | 1/1992 | Stewart et al. | 410/127 |
| 5,094,576 | 3/1992 | Fredelius | 410/145 X |
| 5,378,095 | 1/1995 | Shultz | 410/151 |
| 5,427,487 | 6/1995 | Brosfske | 410/121 |
| 5,443,342 | 8/1995 | Huang | 410/151 |
| 5,472,301 | 12/1995 | Wallen | 410/143 X |

*Primary Examiner*—Stephen Gordon

[57] ABSTRACT

A shift stick device including an outer pipe that has a first foot receiving end and a first axial foot hole. An adjustment mechanism is positioned over the outer pipe and has a movable arm. An inner pipe is received within the outer pipe when passed through the adjustment mechanism. The inner pipe has a plurality of axial holes and a second foot receiving end. A toothed rack is coupled to the inner pipe with a hitch pin. The rack has a pair of ears at one end that overlap the inner pipe and couple to the pipe. Included are a pair of foot pads with each positioned in the first and second foot receiving end of each pipe. Each foot pad is coupled within each pipe. Each foot pad is in contact with one of a pair of sidewalls of a pick-up truck bed. The adjustment mechanism has the rack positioned within and capable of moving the inner pipe in and out of the outer pipe. The adjustment mechanism is capable of adjusting the device between the sidewalls of the truck bed.

1 Claim, 3 Drawing Sheets

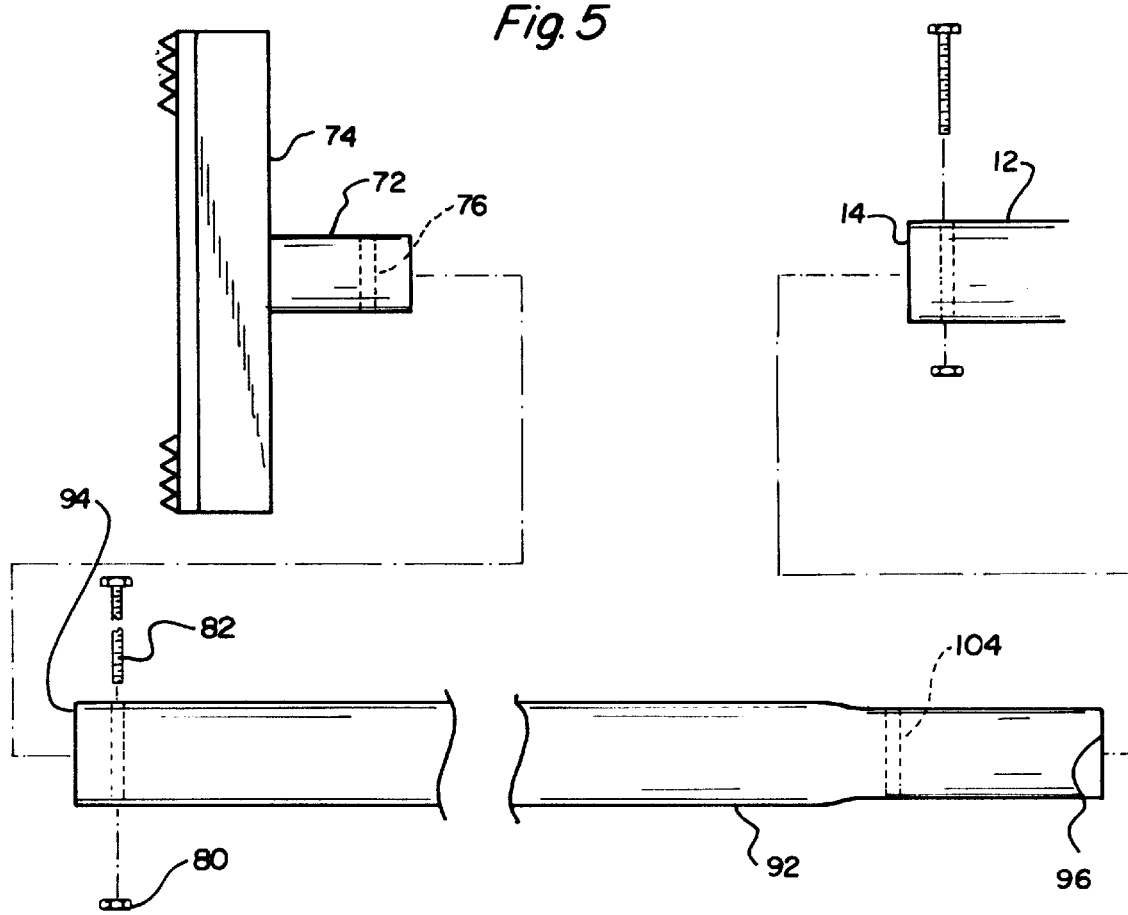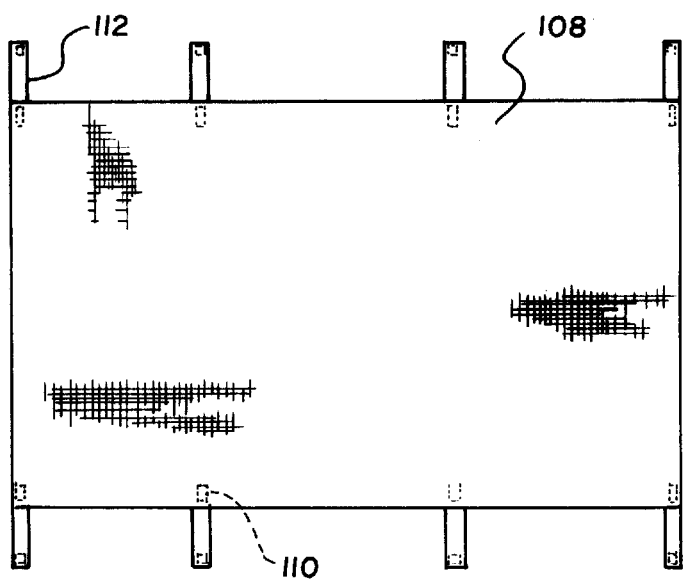

SHIFT STICK DEVICE

BACKGROUND OF THE INVENTION

1. Field of the Invention

The present invention relates to a shift stick device and more particularly pertains to securing cargo in the bed of light pick-up trucks and preventing the cargo from shifting and sliding in the bed when the truck is in motion.

2. Description of the Prior Art

The use of a cargo restraining device is known in the prior art. More specifically, cargo restraining devices heretofore devised and utilized for the purpose of restricting movement of cargo in the truck bed of a pick-up truck are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,427,487 to Brosfske discloses a cargo stabilizer for pick-up trucks. U.S. Pat. No. 5,082,404 to Stewart and Butts discloses a vehicle cargo clamp. U.S. Pat. Des. No. 306,003 to Berkan, Jr. discloses a cargo restraint for pick-up truck. U.S. Pat. No. 4,473,331 to Wisecarver discloses a cargo shoring brace extensible foot assembly. U.S. Pat. No. 4,343,578 to Barnes discloses a load brace stabilizing assembly. U.S. Pat. No. 4,332,515 to Twyman discloses a cartridge-loaded cargo batten. Lastly, U.S. Pat. No. 3,995,565 to Kersey an extensible telescoping cargo brace.

While these devices fulfill their respective, particular objectives and requirements, the aforementioned patents do not describe a shift stick device that allows cargo, when positioned in the truck bed of a light pick-up truck, to be braced therein when the device is mounted between the side walls of the truck and abuts the cargo.

In this respect, the shift stick device according to the present invention substantially departs from the conventional concepts and designs of the prior art, and in doing so provides an apparatus primarily developed for the purpose of securing cargo in the bed of light pick-up trucks and preventing the cargo from shifting and sliding in the bed when the truck is in motion.

Therefore, it can be appreciated that there exists a continuing need for a new and improved shift stick device which can be used for securing cargo in the bed of light pick-up trucks and preventing the cargo from shifting and sliding in the bed when the truck is in motion. In this regard, the present invention substantially fulfills this need.

SUMMARY OF THE INVENTION

In view of the foregoing disadvantages inherent in the known types of cargo restraining devices now present in the prior art, the present invention provides an improved shift stick device. As such, the general purpose of the present invention, which will be described subsequently in greater detail, is to provide a new and improved shift stick device and method which has all the advantages of the prior art and none of the disadvantages.

To attain this, the present invention essentially comprises an outer pipe that is rigid and has a first foot receiving end. The outer pipe has a length of about 42 inches and a diameter of about 2 inches. The outer pipe has a first axial foot hole therethrough and adjacent the first foot receiving end. An adjustment mechanism is positioned over the outer pipe and away from the first foot receiving end. The adjustment mechanism has a movable arm and a locking pin. An inner pipe is received within the outer pipe when passed through the adjustment mechanism. The inner pipe has a length equal to the length of the outer pipe. The inner pipe has a plurality of axial holes and a second foot receiving end. The plurality of axial holes form a second axial foot hole and at least five support holes. A first hole of the five support holes is 2 inches from the second foot receiving end and spaced from the foot hole. An elongated toothed rack is coupled to the inner pipe with a hitch pin. The rack is engaged by the arm of the adjustment mechanism when the inner pipe is positioned within the outer pipe. The rack has a pair of ears at one end that overlap the inner pipe. Each ear has an axial opening with the axial opening of each ear being in symmetrical alignment. The openings of the pair of ears can align with any of the support holes of the inner pipe. The rack is spaced from the second foot end of the inner pipe when coupled to the inner pipe. Included are a pair of T-shaped foot pads. Each foot pad is capable of being positioned in the first and second foot receiving end of each pipe. Each foot pad has a neck portion and a head. The neck of each foot pad has an axial hole therethrough. The axial hole of each foot pad is aligned with the axial foot hole of each pipe when the neck being positioned within the pipe. Each foot pad is releasably coupled within each pipe. Each foot pad is in contact with one of a pair of side walls of a pick-up truck bed, when the device being secured between the side walls. Lastly, the adjustment mechanism has the rack positioned therein. The adjustment mechanism can of move the inner pipe in and out of the outer pipe for decreasing and increasing the length of the device. The arm of the adjustment mechanism engages the teeth of the rack with a lever motion. Whereby, as the arm of the adjustment mechanism is rotated upwardly and downwardly, the toothed rack is pulled into and through the adjustment mechanism, and causes the inner pipe to move into the outer pipe. Pulling the inner pipe into the outer pipe will adjust the device between the side walls of the pick-up truck.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shift stick device which has all of the advantages of the prior art cargo restraining devices and none of the disadvantages.

It is another object of the present invention to provide a new and improved shift stick device which may be easily and efficiently manufactured and marketed.

It is further object of the present invention to provide a new and improved shift stick device which is of durable and reliable constructions.

An even further object of the present invention is to provide a new and improved shift stick device which is susceptible of a low cost of manufacture with regard to both materials and labor, and which accordingly is then susceptible of low prices of sale to the consuming public, thereby making such shift stick device economically available to the buying public.

Still yet another object of the present invention is to provide a new and improved shift stick device which provides in the apparatuses and methods of the prior art some of the advantages thereof, while simultaneously overcoming some of the disadvantages normally associated therewith.

Even still another object of the present invention is to provide a shift stick device for securing cargo in the bed of light pick-up trucks and preventing the cargo from shifting and sliding in the bed when the truck is in motion.

Lastly, it is an object of the present invention to provide a new and improved shift stick device including an outer pipe that has a first foot receiving end and a first axial foot hole. An adjustment mechanism is positioned over the outer pipe and has a movable arm. An inner pipe is received within the outer pipe when passed through the adjustment mechanism. The inner pipe has a plurality of axial holes and a second foot receiving end. A toothed rack is coupled to the inner pipe with a hitch pin. The rack has a pair of ears at one end that overlap the inner pipe and couple to the pipe. Included are a pair of foot pads with each positioned in the first and second foot receiving end of each pipe. Each foot pad is coupled within each pipe. Each foot pad is in contact with one of a pair of sidewalls of a pick-up truck bed. The adjustment mechanism has the rack positioned within and capable of moving the inner pipe in and out of the outer pipe. The adjustment mechanism is capable of adjusting the device between the sidewalls of the truck bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded view of the extension coupling with the foot pad and the adjustment mechanism.

FIG. 6 is a top plan view of the shift stick cover tarp of the present invention.

The same reference numerals refer to the same parts through the various Figures.

DESCRIPTION OF THE PREFERRED EMBODIMENT

Figure 3:
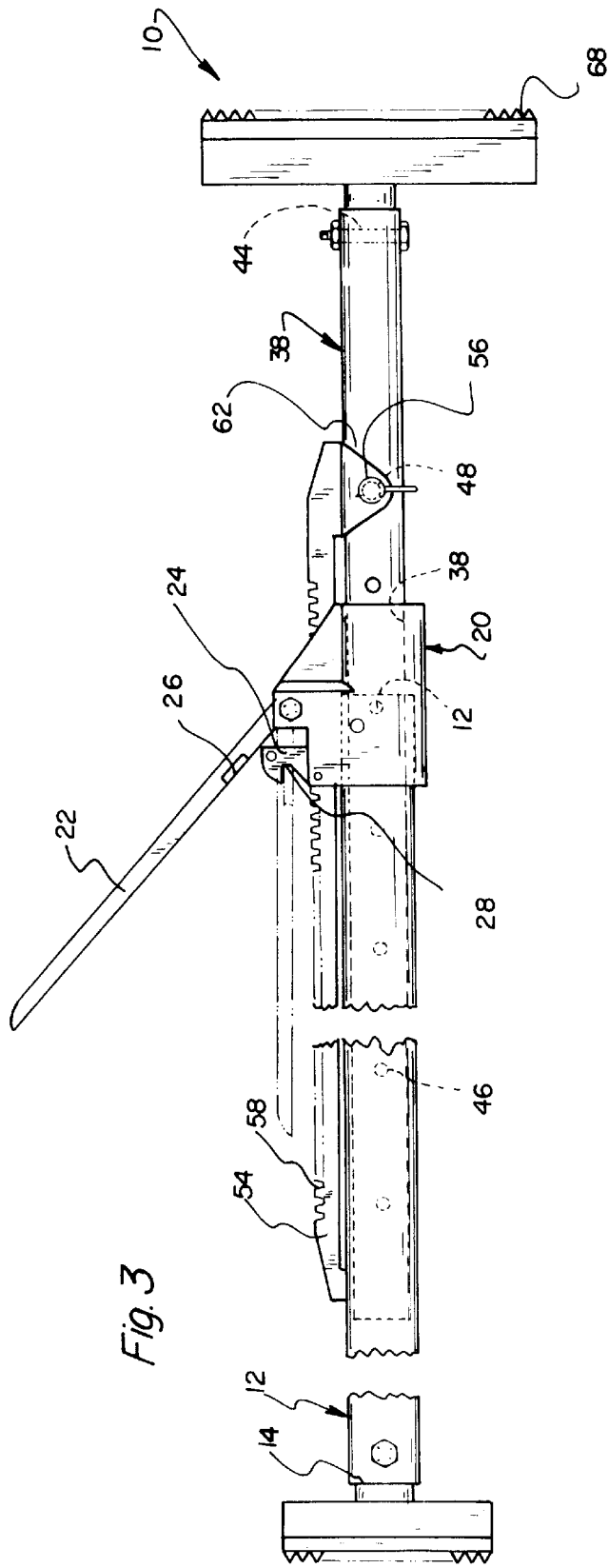
FIG. 3 is a side elevational view of the present invention of FIG. 2.

With reference now to the drawings, and in particular to FIG. 3 thereof, the preferred embodiment of the new and improved shift stick device embodying the principles and concepts of the present invention and generally designated by the reference numeral 10 will be described.

The present invention, the shift stick device 10 is comprised of a plurality of components. Such components in their broadest context include an inner pipe, an outer pipe, a rack and a lever mechanism. Such components are individually configured and correlated with respect to each other so as to attain the desired objective.

Figure 4:
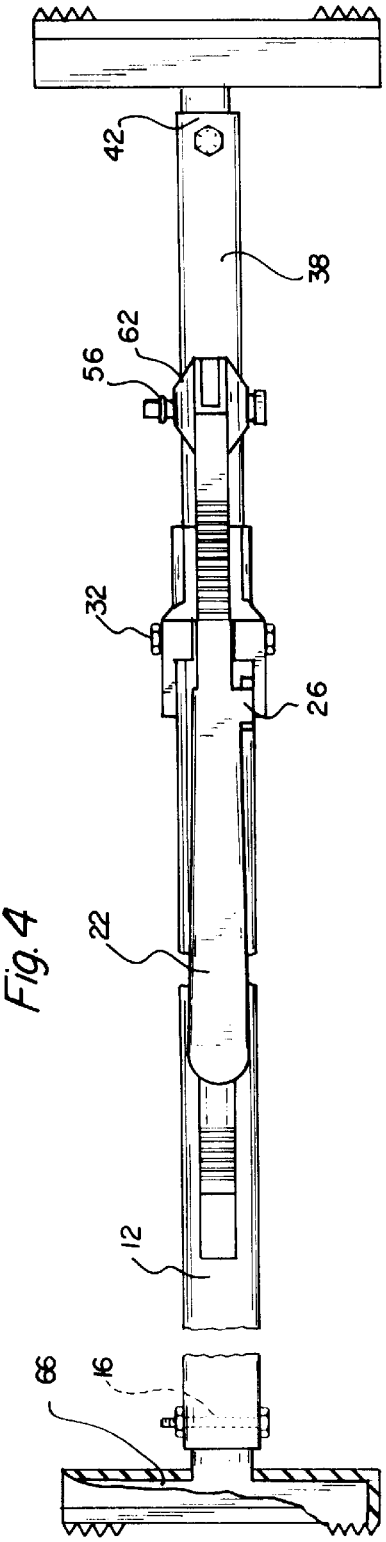
FIG. 4 is a top plan view of the present invention and showing a cross sectional view of a foot pad.

Specifically, the present invention includes an outer pipe 12 that is a rigid metal or metal alloy and is tubular in cross section as represented in FIGS. 3–5. The outer pipe has a first foot receiving end 14, as seen in FIG. 3. The outer pipe has a length of about 42 inches and a diameter of about 2 inches. The outer pipe has a first axial foot hole 16 that is adjacent the first foot receiving end.

As best illustrated in FIG. 3, an adjustment mechanism 20 is positioned over the outer pipe 12 at an end opposite from the first foot receiving end 14. The adjustment mechanism has a straight movable arm 22 (as seen in FIGS. 3 and 4) and a locking pin 24. The arm has a winged projection 26 extending from one side. The projection will engage a slot 28 of the locking pin, when the arm is in a down position, and parallel to the outer pipe. The locking pin is a spring-loaded locking pin. The spring is not shown. The spring allows slight movement of the locking pin to allow placement of projection within the slot. The arm is coupled to the adjustment mechanism by a pivot pin 32. The arm of the adjustment mechanism further includes a gear 33 formed on an inboard end thereof. The placement of the gear of the arm allows the rotation thereof from a disengaged parallel position above the inner pipe to an engaged locked parallel position above the outer pipe thus rotating a total of 180 degrees.

Also, an inner pipe 38 is positioned within the outer pipe 12 and passed through the adjustment mechanism 20. The inner pipe is tubular in cross section as represented in FIGS. 3–5 is a metal or metal alloy, and has a length equal to the length of the outer pipe. The inner pipe has a diameter slightly less than the diameter of the outer pipe. As shown in FIG. 4, the inner pipe has a plurality of axial holes and a second foot receiving end 42. The axial holes form a second axial foot hole 44 and at least five support holes 46. A first hole 48 of the five support holes is two inches from the second foot receiving end and spaced from the foot hole.

Additionally, an elongated tooth rack 54 is coupled to the inner pipe 38 with a hitch pin 56. The rack is a rigid metal, preferably steel, and is about 16 inches in length. The teeth 58 of the rack cover about 90 percent of the top surface. The rack's teeth are engaged by the arm of the adjustment mechanism when the inner pipe is positioned within the outer pipe, and the teeth of the rack are located completely outside of the inner pipe. FIGS. 3 and 4 show the rack having a pair of ears 62 at one end. The ears overlap the inner pipe. Each ear has an axial opening, not shown, with the axial opening of each ear in symmetrical alignment. The openings of the pair of ears are aligned with any of the support holes of the inner pipe to allow the hitch pin to pass through for coupling. The rack is spaced from the second foot end 42 of the inner pipe when coupled. It should be noted that the gear of the adjustment mechanism is further configured so as to start engagement of the rack teeth when the movable arm defines an angle of approximately 45 degrees with respect to the horizontal above the inner tube. The adjustment mechanism thus only engages the rack teeth when the orientation thereof allows a user to apply optimal force thereto.

Figure 1:
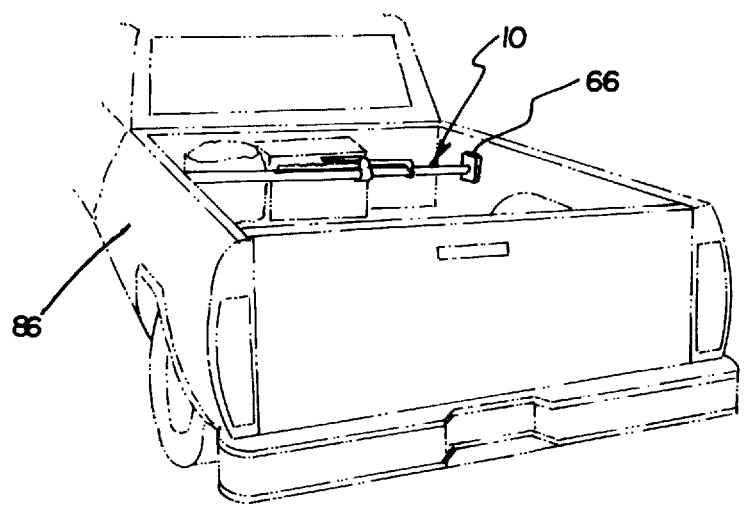
FIG. 1 is a perspective view of the preferred embodiment of the shift stick device constructed in accordance with the principles of the present invention.
Figure 2:
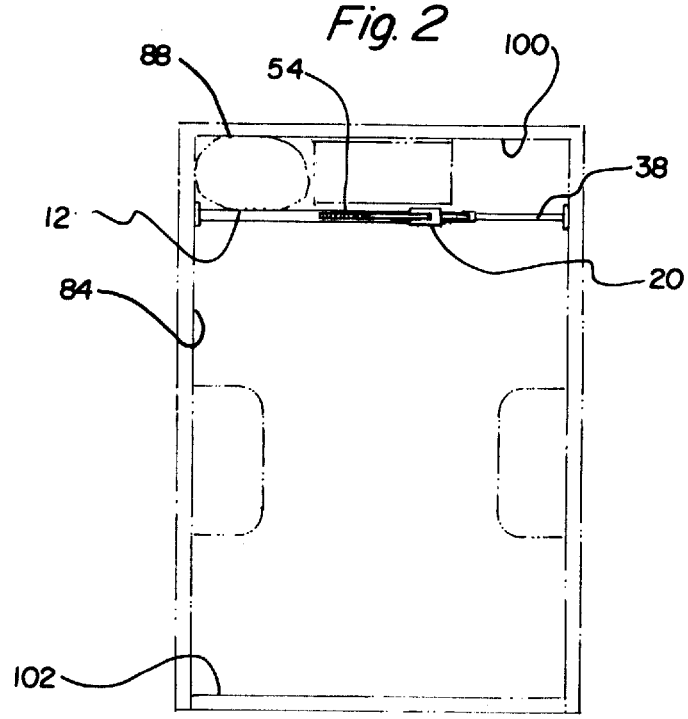
FIG. 2 is a top view of the present invention in an operable configuration.

A pair of T-shaped foot pads 66 are provided. Each foot pad is a metal and comes with a rubber cover 68. One of each foot pad is positionable in the first 14 and second 42 foot receiving end of each pipe, as seen in FIG. 3. Each foot pad has a neck portion 72 and a head 74. The neck of each foot pad has an axial hole 76 as shown in FIG. 5. The axial foot hole of each foot pad may be aligned with the axial foot of each pipe when the neck is positioned within one of the pipes. One of each foot pad is releasably coupled within each pipe with a nut 80 and bolt 82. Each foot pad comes in contact with one of a pair of side walls 84 of a pick-up truck bed 86, when the device 10 is secured between the side walls, as seen in FIGS. 1 and 2. Cargo 88, abutting the device, is prevented from sliding about the truck bed when the foot pads engage the side walls.

Lastly, the adjustment mechanism 20 is a geared lever mechanism. The rack is positioned through the adjustment mechanism and parallel to the outer pipe. The adjustment mechanism, when the arm is raised and lowered, causes movement of the inner pipe. The inner pipe goes in and out of the outer pipe for decreasing and increasing the length of the device. The device 10 can span a distance of 46¼ inches to 83 inches, as needed, for securing the vice for securing to the side walls of the truck bed. The arm of the adjustment mechanism engages the teeth 58 of the rack with a lever motion. Whereby, as the arm of the adjustment mechanism is rotated upward and downward the toothed rack is pulled into and through the adjustment mechanism, and causes the inner pipe to move into the outer pipe to adjust the device between the side walls of the pick-up truck. To re-extend the inner pipe, remove the hitch pin securing the rack, and pull the inner pipe out the outer pipe. When the desired length is reached, replaced the hitch pin.

Furthermore, an extension pipe 92 is included. The extension pipe has a third foot receiving end 94 and an extension end 96. The extension end may be positioned within the first foot receiving end 14 of the outer pipe, as shown in FIG. 5. The extension pipe is 24 inches in length and has a portion thereof with a length of 8 inches having diameter equivalent to that of the inner pipe and a portion thereof having a diameter equivalent to that of the outer pipe. The addition of the extension pipe will allow the device 10 to extend from the cab back 100 to the truck bed door 102.

The extension end of the extension pipe is machined to have a necked down diameter equal to the diameter of the inner pipe. The extension end has an axial hole 104 that aligns with the first axial foot hole of the outer pipe. The extension pipe and outer pipe are coupled with a nut and bolt. The third foot receiving end has one of the foot pads coupled within at the neck of the foot pad.

FIG. 6 is an illustration of the cover 108 of the device. The cover may be placed over the cargo 88, once the device secures it within the truck bed. The cover has a plurality of straps 112 proportionately spaced along two sides of the cover. When the cover is placed over the cargo and the device, the straps overlap the device and couple to the cover with pile-type fastener assemblies 110.

The shift stick device of the present invention will secure cargo in light truck beds and prevent the cargo from sliding around within the truck bed when the truck is in motion. The device is an adjustable-length bar that is easily secured between any two walls of the truck bed to create a fixed barrier to hold cargo in place. The device includes two pipes having different diameters and identical lengths. The pipe with the smaller diameter is positioned within the pipe having the larger diameter for operation of the device. When the two pipes are fitted together, they can be adjusted to span a distance of 46½ to 83 inches. Included with the device is an extension pipe that can be connected to the pipe, outer pipe, that has the larger diameter. The extension pipe allows the shift stick device to reach from front to rear of the long bed truck.

The device includes a tooth rack and gear lever mechanism. The tooth rack is coupled to the inner pipe, that has the smaller diameter. The gear lever mechanism/adjustment mechanism is positioned over one end of the outer pipe. When the inner pipe is positioned within the outer pipe, the rack is parallel to the outer pipe. The gear lever mechanism has an arm which engages the teeth of the rack. The lever is used to produce a chosen increment of pressure outward from end to end so that the foot pads of the device rests aggressively grips the truck bed walls. It is to be that when the arm is rotated, to engage the teeth of the rack, it allows the inner pipe to adjust at an approximate length of 16 inches without having to unlock the rack from the inner pipe to increase the length.

Also, a specially designed shift stick cover is included. The shift stick cover is used to cover the cargo that is being secured in the truck bed by the device. The cover has reinforced straps placed at intervals along each length-wise edge, for securing around the device via pile-type fasteners or snap-type fasteners. In the depiction of the present invention, pile-fasteners are the preferred method of securing the cargo the device.

To prevent damage to the walls of the truck bed, the foot pads of the device are covered with a non-slip grip rubber pad. This pad will not mar paint jobs on unlined beds. The pads can be removed if desired, to expose a machined metal contact surface that will aggressively grip bed liners.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shift stick device for securing cargo in a pick-up bed comprising in combination:

an outer tubular pipe being rigid and having a first foot receiving end, the outer pipe having a length of about 42 inches and a diameter of about 2 inches, the outer pipe having the first axial foot hole therethrough and adjacent the first foot receiving end;

an inner tubular pipe;

an adjustment mechanism being positionable over the outer pipe and away from the first foot receiving end, the adjustment mechanism having a movable straight arm with a winged projection and a locking pin with a slot, the movable arm being positionable in a downward orientation for allowing the winged projection to engage the slot of the locking pin for locking thereof in a parallel orientation to the outer pipe, a gear being interconnected to the an inboard end of the movable arm, the gear allowing rotation of the movable arm from a disengaged parallel position above the inner pipe to an engaged locked parallel position in said downward orientation and above the outer pipe;

said inner pipe capable of being received within the outer pipe when passed through the adjustment mechanism, the inner pipe having a length equal to the length of the outer pipe, the inner pipe having a plurality of axial holes therethrough and a second axial foot receiving end, the axial holes of said inner pipe forming a second axial foot hole and at least five support holes, a first hole of the at least five support holes being 2 inches from the second axial foot receiving end and spaced from the second axial foot hole;

an elongated toothed rack being coupled to the inner pipe with a hitch pin, the toothed rack being about 16 inches long; the toothed rack being engaged by the gear of the adjustment mechanism when the inner pipe is positioned within the outer pipe, the rack having a pair of ears at one end that overlap the inner pipe, each ear having an axial opening with the axial opening of each ear being in symmetrical alignment, the openings of the pair of ears capable of being aligned with any of the support holes of the inner pipe for allowing the hitch pin to pass through for coupling, the rack being spaced from the second foot receiving end of the inner pipe when coupled thereto, at least the teeth of the rack being located completely outside the inner pipe;

a pair of T-shaped foot pads with a first of said foot pads being positionable in the second foot receiving end of the inner pipe, each foot pad having a neck portion and a head, the head having a rubber cover, the neck of each foot pad having an axial hole therethrough, the axial hole of said first foot pad capable of being aligned with the axial foot hole of said inner pipe when the respective neck is positioned therein, each foot pad capable of being releasably coupled to each pipe, each foot pad capable of being in contact within one of a pair of side walls of a pickup truck bed when the device is secured therebetween;

the adjustment mechanism having the rack positionable there in, the adjustment mechanism being capable of moving the inner pipe in and out of the outer pipe for decreasing and increasing the length of the device, the arm of the adjustment mechanism capable of engaging the teeth of the rack via the gear with a lever motion, whereby as the arm of the adjustment mechanism is rotated upwardly and downwardly, the toothed rack is pulled into and through the adjustment mechanism, and causes the inner pipe to move into or out of the outer pipe for adjusting the device between side walls of the pick-up truck; and wherein the second of said pair of T-shaped pads is releasably coupled to the outer pipe via an extension pipe, said extension pipe including first and second ends, said first extension pipe end comprising a third foot receiving end and including an axial hole, the second end of said extension pipe including a necked down smaller diameter portion and another axial hole, the first and second end axial holes of the extension pipe aligning with the axial hole of the second T-shaped pad and the first axial foot hole of the outer pipe respectively wherein the respective aligned holes of the outer pipe, extension pipe, and second pad receive nut and bolt fastening assemblies.

* * * * *